United States Patent [19]

Pfeiffer et al.

[11] Patent Number: 4,969,086

[45] Date of Patent: Nov. 6, 1990

[54] SYSTEM FOR REDUCING MAIN MEMORY ACCESS TIME BY BYPASSING ADDRESS EXPANSION DEVICE WHEN HIGH-ORDER ADDRESS PORTIONS ARE UNALTERED

[75] Inventors: Klaus Pfeiffer, Gilching; Wolfgang Kosler, Munich; Gerd Trimpop, Wolfratshausen; Erich Paulmichl, Gauting, all of Fed. Rep. of Germany

[73] Assignee: Siemens Aktiengesellschaft, Berlin and Munich, Fed. Rep. of Germany

[21] Appl. No.: 376,148

[22] Filed: Jul. 5, 1989

Related U.S. Application Data

[63] Continuation of Ser. No. 939,612, Dec. 8, 1986, abandoned.

[30] Foreign Application Priority Data

Jan. 13, 1986 [DE] Fed. Rep. of Germany ....... 3600744

[51] Int. Cl.⁵ .................. G06F 12/04; G06F 12/06; G06F 7/02; G06F 9/355

[52] U.S. Cl. .................. 364/200; 364/245.1; 364/244.7; 364/246.3; 364/255.4; 364/259.2; 364/259.8; 364/245.31; 364/244; 364/246.7; 364/247.2

[58] Field of Search ... 364/200 MS File, 900 MS File

[56] References Cited

U.S. PATENT DOCUMENTS 4,307,448 12/1981 Sattler .................. 364/200

Primary Examiner—Archie E. Williams, Jr.
Assistant Examiner—Ayni Mohamed
Attorney, Agent, or Firm—Hill, Van Santen, Steadman & Simpson

[57] ABSTRACT

Proceeding from a known method and apparatus for expanding the address for accessing a main memory by a central controller of a switching system, a determination is made in a comparator as to whether the address information of the high-order address lines or address registers of the expansion device with respect to a preceding main memory access changes in comparison to the current main memory access. When coincidence is present, the high-order portion of the main memory address in the preceding main memory access stored in an address register is immediately used for the formation of the overall main memory address.

5 Claims, 1 Drawing Sheet

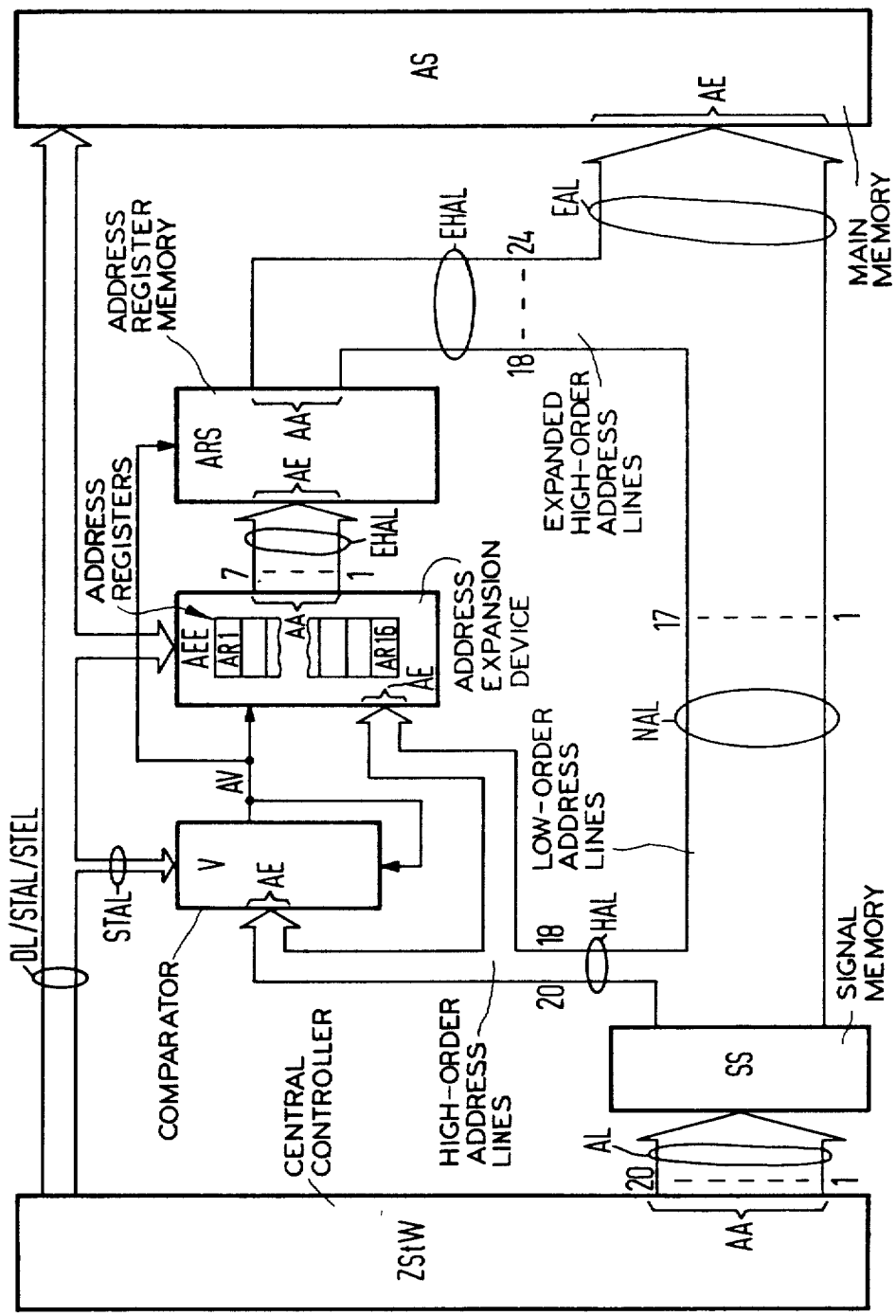

SYSTEM FOR REDUCING MAIN MEMORY ACCESS TIME BY BYPASSING ADDRESS EXPANSION DEVICE WHEN HIGH-ORDER ADDRESS PORTIONS ARE UNALTERED

This is a continuation of application Ser. No. 939,612, filed 12/8/86 now abandoned.

BACKGROUND OF THE INVENTION

1. Field of the Invention

The present invention relates to a method for forming addresses for the drive selection of a main memory of a program-controlled switching system which encompasses a central controller and a device for expanding the extent of the addresses (expansion device), these switching system components being connected via a data bus or, respectively, a data line group, a control bus or, respectively, a control line group and a status bus, or, respectively, a status line group and at least $2 \leq n \leq 4$ of the high-order address lines extend from the central controller to the expansion device. This device comprises address registers whose plurality maximally corresponds to the possible binary code combinations of the connected high-order address lines and the address registers contain at least $n+1$ memory locations and each memory location of the selected address register has an address line assigned thereto. The at least $n+1$ high-order address line is present at the output of the expansion device, together with the low-order address lines coming from the central control, form an expanded address line group and are connected to the main memory and the address registers receive the address information from the central controller via the data line group, whereby the address registers are updated only when the main memory regions addressed and defined by the central controlled are changed.

2. Description of the Prior Art

Given the method known from the publication TTL-Databook, Vol. 1, 1981, pp. 7–622, an expansion device is employed which expands an address line group coming from a microprocessor by a maximum of eight address lines. To this end, a maximum of four of the high-order address lines of the microprocessor are not directly connected to the main memory but are connected to the expansion device. High-order address lines are represented by those address lines which represent the most significant binary values within the overall address line group. The binary code combinations contained in the maximum of four-high order address lines respectively determine a register in the expansion device. Given a maximum expansion to the greatest possible address line group, one address line is assigned to each of the twelve memory locations of the identified address register. The current address register connection are communicated through the expansion device from the central controller via the data lines before the following main memory access. A renewed communication of the address register information before the following main memory access is only necessary when the central controller addresses a different main memory region which was not represented by the preceding address register information. The low-order address lines coming directly from the central controller, together with the address lines brought in from the expansion device, form an expanded address line group. As a result of the expanded address line group, the main memory assigned to the central controller can then be enlarged.

In this method, the expansion device is co-involved in each main memory access of the central controller, i.e. the initially-described processing steps sequence at each main memory access. This means an increase memory access time due to the processing times within the expansion device, even when the high-order, expanded portion of the address line information and, therefore, the addressed memory area, remain the same.

SUMMARY OF THE INVENTION

The object of the present invention is to reduce the access time of the central controller to the main memory upon retention of the address expansion method when the high-order and, therefore, expanded portion of the address line information remains unaltered.

The above object is achieved in a method of the type set forth above which is particularly characterized in that the high-order portion of the main memory address output by the expansion device in the respectively preceding main memory access is stored, in that the binary combination contained in the high-order address lines in the preceding main memory access is stored and, in the following main memory access, the current binary code combination of the high-order address lines is compared to the preceding combination, and in that, given coincidence, the immediate formation of the address for the selection of the main memory is initiated, whereupon the stored, high-order portion of the main memory address and the low-order portion of the main memory address formed by the central controller which is intermediately stored for the purpose of time-suited through-connection are combined insofar as a communication from the central controller regarding a change of the address register information is not present.

In case there is no coincidence, i.e. when the high-order portion of the main memory address of the preceding and of the current main memory access do not coincide, or when the address register information change, the comparator initiates the known address forming method which was initially set forth above.

The advantage of the method of the present invention is particularly that the main memory access time is significantly shortened given a main memory access wherein the same area of the main memory, determined by the high-order portion of the main memory address, is addressed as in the preceding main memory access. Since the processing of tables frequently occurs in communications switching, the same main memory area will be addressed or, respectively, the high-order portion of the main memory address will remain unaltered in two successive main memory accesses with a probability of more than 60%. A main memory access time which is significantly shorter, on average, is therefore also achieved by the method of the present invention.

The comparators, the address register and the signal memory set forth hereinbelow are provided for incrementing the method of the present invention in addition to the central controller, the expansion device and the main memory.

The high-order portion of the main memory address is formed by the central controller and the preceding main memory access is thereby stored in the comparator and is compared to the current, high-order portion of the main memory address in the following main memory access. The high-order and expanded portion of the main memory address output during the preceding main memory access by the expansion device is stored in the address register memory. During the following main memory access, the overall main memory address is formed with this stored high-order portion of the main memory address together with the low-order portion of the main memory address insofar as the high-order portion of the main memory address of the current and of the preceding memory accesses coincide in the comparator and the address register information does not change. The comparator is informed of the modification of the address register information via the status line, being informed by the central controlled.

BRIEF DESCRIPTION OF THE DRAWINGS

Other objects, features and advantages of the invention, its organization, construction and mode of operation will be best understood from the following detailed description, taken with the accompanying drawing, of which FIG. 1 is a schematic representation of those components of a digital telecommunications switching system necessary for an understanding of the invention.

DESCRIPTION OF THE PREFERRED EMBODIMENT

Referring to the drawing, those components of a digital telecommunication switching system necessary for an understanding of the invention are shown. A central controller ZStW or, respectively, a microprocessor, processes a maximum of 16-bit data words and can maximally address a main memory AS of one megabyte via 20 address outputs and address lines AL ($2^{20}$ addresses), addressing the main memory in a binary code. A central controller ZStW having these properties is represented, for example, by the microprocessor SAB 8086 of Siemens AG. The job of the time-suited through-connection of the address information supplied via the address lines AL to the following system component is assumed by a signal memory SS connected to central controller ZStW. The signal memory SS can be formed, for example, by a known integrated circuit of the advanced low-power Shottky series (ALS series) having the designation ALS 580. The 17 low-order address outputs AA of the signal memory SS and the 17 low-order address inputs AE of a main memory AS are connected by an address line group AL. The three high-order address lines HAL are supplied in parallel to a comparator V which is constructed based on an ALS 521 compares the current address information of the high-order memory lines HAL to that of the preceding memory access. In addition, the central control ZStW informs the comparator V via a status line group STAL which is also connected to the address register memory ARS and to the main memory AS whether a change of the address register information in the expansion device AEE occurred between the current and the preceding main memory access. When both the address register information and the address line information of the three high-order address line HAL remains unaltered, then the comparator V informs the address register memory ARS via its control output AV and initiates the immediate formation of the overall main memory address. The address information contained and stored in the address register memory ARS in 7 (maximally 12) memory locations per register proceeds to 7 (maximally 12)outputs AA of the address register memory ARS and is supplied to the high-order address inputs A of the main memory AS via 7 (maximally 12) high-order address lines AL or, respectively, via an expanded address line group EHAL and, together with the low-order address line group NAL, therefore forms a common, expanded address line group EAL having 24 address lines AL which exhibit an overall addressing capacity of $2^{24}$ addresses or, respectively, can address a main memory AS of 16 megabytes.

When the address line information of the current main memory access changes in comparison to the preceding access or when the address register information in the expansion device AEE changes, the comparator V identifies the same and informs the expansion device AEE via its control output AV and initiates the known formation of the main memory address via the expansion device AEE. The received, binarily-coded address line information of the three-order address lines HAL is decoded in the expansion device AE, whereby one address register AR from a maximum of 16 existing address registers AR is identified. The central controller ZStW communicates the address register information to the expansion device AE via the data line group DL and they are inserted into the corresponding address register AR of the expansion device AEE. In order to be able to form an expanded main memory address or, respectively an expanded address line group EHAL, at least one memory location in addition per address register AR must be occupied with address register information than there are high-order address lines HAL at the address inputs AE of the expansion device AEE. Each memory location of the identified address register AR has an address output AA of the expansion device assigned thereto, whereby the address outputs AA are connected to the address inputs AE of the address register memory ARS. The address register memory ARS stores the information applied to the address inputs AE and simultaneously transmit the same to the main memory AS via the addressing outputs AA for expanded, high-order address lines EHAL, transmitting this information together with the information of the low-order address information supplied from the signal memory SS. The expansion device is likewise constructed with an integrated circuit of the ALS series having the designation ALS 610.

The central controller ZStW controls the system components in the main memory AS and the expansion device AEE via a data line group DL, the status line group STAL and the control line group STEL which are usually provided in microprocessor systems.

Although we have described our invention by reference to an illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method for forming addresses for accessing a main memory of a program-controlled switching system which comprises a central controller and an expansion device for expanding the scope of the addresses, the controller and the expansion device being connected by way of bus means, at least $2 \leq n \leq 4$ of the high-order address lines extending from the central controller to the expansion device which comprises a plurality of address registers whose number maximally corresponds to the possible binary code combinations of high-order address lines, the address registers containing at least $n+1$ memory locations and each memory location of a selected address register having an address line assigned thereto, the at least n+1 high-order address lines present at the output of the expansion device together with the low-order address lines extending from the central controller forming an expanded address line group connected to the main memory, the address registers receiving the address information from the central controller via a data line group, the improvement wherein the address registers are up-dated only when the main memory regions addressed and defined by the central controller are changed, and comprising the steps of:

intermediately storing the low-order portion of the main memory address during the current main memory access:

storing the high-order portion of the main memory address of the preceding main memory access;

storing the binary combination contained in the high-order address lines in the preceding main memory access;

in the next following main memory access, comparing a current binary code combination of the high-order address lines with the previously stored binary code combination of the high-order address line; and in response to the coincidence, initiating immediate formation of the address for memory access by combining the stored high-order portion of the main memory address and the intermediately stored low-order portion of the main memory address insofar as a communication is not present from the central controller regarding the change of the address register information.

2. In an arrangement for forming addresses for accessing a main memory of a program-controlled switching system of the type which comprises a central controller and an expansion device for expanding the scope of the address, in which the central controller and the expansion device are connected by way of a bus system in at which $2 \leq n \leq 4$ high-order address lines connect the central controller to the expansion device, in which the expansion device comprises a plurality of address registers whose number maximally corresponds to the possible binary code combinations of the connected high-order address lines, in which the address registers comprise at least n+1 memory locations and each memory location of a selected address register has an address line assigned thereto and at least n+1 high-order address lines at the output of the expansion device together with low-order address lines extending from the central controller, form an expanded address line group which is connected to the main memory, and in which the address registers receive the address information from the central controller via a data line group of the bus system, the improvement of decreasing access time by up-dating the address registers only when the main memory regions addressed and defined by the central controller are changed, said improvement comprising:

an address register memory connected to said expansion device and to said main memory;

a comparator connected to said bus system;

a signal memory connected to said central controller for receiving addresses, said signal memory comprising high-order outputs connected to said comparator and to said expansion device and low-order outputs connected to said main memory;

said comparator including a control output and said expansion device and said address register memory each including a control input connected to said control output, said comparator operated in response to non-coincidence to inform said expansion device of a change in the address information between the current address and the preceding address and operated in response to coincidence to inform said address register memory of the coincidence of the preceding high-order portion of the address and the current high-order portion of the addresss; and said address register memory connected to said main memory and operable in response to coincidence to immediately combine said high-order portion and said low-order portion of said address to access said main memory.

3. An arrangement for forming addresses for addressing a main memory comprising:

a microprocessor having high order address lines and low order address lines;

storing means accepting said high and low order address lines for latching data received on said high and low order address lines and through connecting said latched data to an output of said storing means, said output of said storing means having high order address data and low order address data;

comparator means accepting said high order address data from said storing means for comparing a high order memory address occurring in a previous memory cycle with a high order memory address occurring in a current memory cycle and generating a control signal at an output thereof, said control signal having a first condition indicative of coincidence between said high order memory address occurring in said previous memory cycle and said high order memory address occurring in said current memory cycle and a second condition indicative of non-coincidence between said high order memory address occurring in said previous memory cycle and said high order memory address occurring in said current memory cycle;

an address expansion device accepting said high order address data from said storing means and said control signal from said comparator means, said address expansion device responsive to said control signal for generating an expanded memory address at an output of said address expansion device whenever said control signal is in said second condition;

an address register accepting said expanded memory address and said control signal and providing means for through-connecting said expanded memory address to an output of said address register whenever said control signal is in said second state and for maintaining said expanded memory address at said output of said address register whenever said control signal is in said first state; and a main memory responsive to said output of said address register and said low order address lines from said storing means for the selectively accessing data contained in said main memory.

4. An arrangement as recited in claim 3, wherein said address expansion device has a series of registers containing expanded memory addresses, said expanded memory addresses in said series of registers alterable by said microprocessor.

5. An arrangement as recited in claim 4, wherein said status lines are connected to said comparator means for placing said control signal in said second condition whenever said series of expanded memory addresses in said registers is altered by said microprocessor.

* * * * *